Nov. 28, 1967  S. W. AMBERG ET AL  3,354,605
SHRINK-FILM CLOSURES
Filed July 10, 1964  9 Sheets-Sheet 1

INVENTORS.
RALPH G. AMBERG.
HAROLD PORTER JR.
STEPHEN W. AMBERG.
JULIUS PHILLIPS,

Ward, Haselton, McChannon, Orme, Brooks & Fitzpatrick.
ATTORNEYS.

Nov. 28, 1967   S. W. AMBERG ET AL   3,354,605
SHRINK-FILM CLOSURES

Filed July 10, 1964   9 Sheets-Sheet 5

INVENTORS.
RALPH G. AMBERG.
HAROLD PORTER JR.
STEPHEN W. AMBERG.
JULIUS PHILLIPS.

Ward, Haselton, McElhannon, Orme, Brooks & Fitzpatrick
ATTORNEYS.

Nov. 28, 1967 S. W. AMBERG ET AL 3,354,605
SHRINK-FILM CLOSURES
Filed July 10, 1964 9 Sheets-Sheet 6

INVENTORS.
RALPH G. AMBERG.
HAROLD PORTER JR.
STEPHEN W. AMBERG.
JULIUS PHILLIPS.
Ward, Haselton, McElhannon,
Orme, Brooks, & Fitzpatrick
ATTORNEYS.

Nov. 28, 1967  S. W. AMBERG ET AL  3,354,605
SHRINK-FILM CLOSURES
Filed July 10, 1964  9 Sheets-Sheet 9

INVENTORS
RALPH G. AMBERG
HAROLD PORTER, JR.
STEPHEN W. AMBERG
JULIUS PHILLIPS

ATTORNEYS

3,354,605
SHRINK-FILM CLOSURES
Stephen W. Amberg, St. James, N.Y., Ralph G. Amberg, Monticello, Ind., and Harold Porter, Jr., Setauket, and Julius Phillips, Bronx, N.Y., assignors to Lily-Tulip Cup Corporation, New York, N.Y., a corporation of Delaware
Filed July 10, 1964, Ser. No. 381,739
19 Claims. (Cl. 53—42)

This invention relates to capping techniques and more particularly to the capping of receptacles, such as paper or plastic receptacles containing comestibles or liquids, with a closure of the shrink-film type.

Containers having shrink-film closures, and methods and apparatus for simultaneously forming and applying shrink-film closures to receptacles are known. An oversized piece of thin and shrinkable sheet material, such as polyethylene, is placed upon and across the receptacle mouth opening whereupon heat is applied to the peripherally extending excess polyethylene sheet material to shrink the same into somewhat bunched or wrinkled contact relation with the periphery of the receptacle while maintaining the central area of the polyethylene in relatively cool condition so that it will not shrink. In such processes and apparatus as have been known, the application of heat to the excess sheet material includes blowing heated air towards the receptacle periphery, the central area of the closure being shielded from the heat by covering the same with an insulated flat disc or belt which rests upon the receptacle mouth rim thus sealing off the central area from the air blow. The resulting closure is relatively elastic in its shrunken edge regions so that it may be easily removed from the receptacles using the fingers to slightly expand the shrunken periphery and slip the closure off the receptacle. It should be noted that such shrink-film closures are not actually bonded to the receptacle.

The present invention contemplates that shrink-film closures might be economically and easily formed on paper or plastic receptacles which have been hand-filled with comestibles such as potato salad or the like by the merchant within the store where such comestible items are sold over-the-counter.

However, receptacles having shrink-film closures of such conventional type are not well suited to withstand somewhat rough handling such as would be experienced, for example, were the capped receptacle, containing a comestible item such as cole slaw, potato salad, fruit cocktail or the like, to be placed in a shopping bag and carried to the home as would a housewife when doing her everyday shopping. The bunched or wrinkled type of shrink-film closure will more probably leak or become removed during such handling, even though the polyethylene closure material is itself sufficiently strong to resist puncture or other direct breakage.

It becomes apparent that, if shrink-film type closures are to be used for such purposes, the closure material must be shrunk into more tightly fitting relation with the receptacle periphery so that it cannot be dislodged by inadvertent rough handling. But it is also apparent that such an exceptionally tight fitting closure must be easily removable by the housewife using the fingers rather than a knife or other tool as would provoke inconvenience. The present invention provides a container having such a tight fitting yet easily removable shrink-film closure.

Moreover, it is apparent that such an extraordinarily tight fitting shrink-film closure must be very quickly and very easily applied by the merchant if he is to take full advantage of the known economy inherent in the use of such closures. In addition, the machine which he uses to apply the closure must have a capability of accommodating receptacles, such as paper or plastic trays, which are more often than not heaped to overflowing or "mounded" with the comestible item, such as potato salad, as might be placed therein using a serving spoon or fork with but a minimum of care. The present invention provides a machine and method for virtually instantaneously forming and applying such a tight fitting shrink-film closure to a receptacle under all conditions of filling thereof, including such overfill conditions. In addition, the machine incorporates features providing an initial tear in the shrunken periphery of the closure for its subsequent manual removal by the housewife, but in a manner such that the initial tear will not extend itself such as might otherwise permit self-rupturing of the closure under the usual conditions of handling the sealed container before it is deliberately opened.

In addition to the foregoing, it is recognized that relatively unskilled persons will be operating the shrink-film capping machine in delicatessens and other food stores, and it is therefore necessary that the machine be rugged, very easily used, maintained and cleaned, and not require sensitive control during operation. Further, the machine should be capable of forming and applying the closures virtually instantaneously, and the time during which heat is applied should not be critical so that an overexposure of the capping film to heat will not mutilate or destroy the same. The present invention provides a shrink-film capping machine which includes all of such desirable features and advantages.

Further with regard to the machine itself, prior shrink-film capping machines have incorporated air blowers for jetting heated air about the receptacle periphery, as has been mentioned. The inclusion of an air blower makes for noisy operation of the machine as is undesirable in retail food stores and the like. In addition, the blower and its wiring, etc. present additional maintenance problems. The shrink-film capping machine of the present invention does not include a hot air blower, yet achieves a highly effective shrink seal, thus avoiding the referred to undesirable features of prior capping machines.

Briefly describing the invention in its preferred embodiment, a relatively thin but stiff plastic tray-like receptacle containing a foodstuff such as potato salad or the like is capped with a tightly shrunk-on sheet of shrink-film material such as transparent polyethylene film. Although tightly fitting, the shrink-film cap includes an unshrunken zone within its shrunken periphery providing an unstressed area of the closure periphery within which a slit of the closure is disposed for initiating tearing to remove the cap. The unstressed nature of the zone precludes any tendency of the tear slit to split or rupture during even rough handling of the sealed container. In addition, the tear slit is disposed in direction tangential to the receptacle periphery to further facilitate closure removal. A spot of color, such as either an ink mark or printed indicia on the closure film material, attracts the housewife's attention to this unshrunken area from which cap removal is initiated.

The shrink-film closure is formed and applied to the filled receptacle in a capping machine which, in its embodiment as herein illustrated, accommodates two such filled but uncapped receptacles for applying individual closures to both simultaneously. Of course, the machine might be made to accommodate only one, or more than two receptacles.

It will also be noted that, using the capping technique provided by the invention, the shape of the receptacle mouth rim is not critical. That is, the open top of the receptacle may be either circular or rectangular or even triangular, yet the same machine will form the contemplated tight fitting closure on it either alone, or simultaneously with the application of a closure on another receptacle having different shape. Moreover, the machine will handle receptacles having different heights, within a reasonable limit of variation, and can be easily adapted by a change of bottom plates to accommodate receptacles having quite different height.

Generally describing the shrink-film capping machine in its preferred embodiment, a base plate supports at its forward end a pair of receptacle holders, each of the latter comprising a receptacle supporting lower plate, and a centrally apertured upper plate in vertically spaced relation with respect to the underlying lower plate and which presents a flat but roughened or rubberized surface surrounding the receptacle, at an elevation somewhat below the mouth rim of the receptacle, on which the peripheral excess of the oversized shrink-film material (which has been disposed across the top of the receptacle) will rest while being heated to shrink the same during the capping operation. At its rearward end, the base plate of the machine further supports a transversely disposed roll of the shrink-film material in position for its leading edge to be manually drawn forward to cover both receptacle holders and the comestible-filled receptacles which have been previously placed therein. A so-called film table, having a pivotable film weight, is mounted on the base plate between the receptacle holders and the film roll to maintain the leading edge of the film in position to be easily grasped by the fingers when initiating each capping operation.

A multiple capping head unit is suspended over the receptacle holders, the capping head unit being supported between a pair of downwardly pivotable and counterweighted arms which are mounted on the base plate and which normally hold the capping head unit in its upper, out-of-engagement position. The capping head unit includes electric heating elements and a heat platen which has a pair of enlarged apertures for passing over and surrounding the tops of the respective receptacles in out-of-contact relation when the capping head unit is manually pivoted in the downward direction during a capping operation. At the underside of the capping head unit, and heated by the platen, are a pair of film-heating plates which correspond in size and shape with, and which will directly contact the aforementioned upper plates of the receptacle holders to "sandwich" the excess shrink-film therebetween and virtually instantaneously heat the same to shrink temperature. The underside of the capping head further has a T-shaped knife arrangement for severing the closure film from the roll, and between the receptacles, contemporaneously with the simple downward movement.

As soon as the capping head is raised, and because of the higher elevation of the receptacle mouth rims as compared to that of the referred to upper plates of the receptacle holders, the now heated and thereupon released peripheral excess of shrink-film surrounding each receptacle will shrink instantaneously into tight-fitting engagement with the side wall of the receptacle which it surrounds at a location below the mouth rim thereof. Because during the capping operation the central area of the film has been disposed within the heated air zone formed by one of the aforementioned heat platen apertures, it will be heated slightly and tend to shrink, thereby drawing itself someone taut over the receptacle so that wrinkles in this area of the films are substantially eliminated. Further, it will be noted that the platen apertures permit the central areas of the shrink-film material to be "mounded" upwardly, as would naturally occur when the closure material is disposed across overfilled receptacles, as previously mentioned.

The shrink-film closure thus formed is extremely tight fitting and would be difficult to manually remove but for an edge slit which is formed therein during the capping operation. But the edge slit itself might tend to initiate inadvertent tearing of the formed closure unless the slit is disposed within an unstressed (i.e., relatively unshrunken) edge zone of the closure in manner, and by features of the capping machine to be described. Briefly, such features include respective additional knife segments of the capping head unit for forming the slit in each closure, each knife segment being disposed to form the edge slit in direction generally tangential to the mouth rim periphery of the receptacle, and each knife segment residing within an upwardly recessed zone at the underside of the film heating plate through which it passes. The upwardly recessed zone, which is located at or near the edge of each film heating plate of the capping head unit, provides a generally unheated area of the plate under which the shrink-film will not shrink to the extent of its surrounding area when the film heating plate is in contact with the upper plate of the corresponding receptacle holder on which the peripheral excess shrink-film is disposed, as aforesaid.

The closure of the now sealed container should be punctured to permit escape of gases or the like from within, such as would emanate from heated or carbonaceous items contained therein. To form such puncture simultaneously with the capping operation, the capping head carries a pair of downwardly pointing needles respectively located for piercing the centers of the two simultaneously formed closures.

Both the film heating plates of the capping head and the receptacle holders are easily removable from their mounts for replacement by receptacle holders and corresponding film heating plates to accommodate receptacles of different sizes and shapes.

These and other objects, features and advantages of the present invention will become more fully apparent from the following detailed description thereof, when taken with reference to the accompanying drawings, in which:

FIGURE 12 is a perspective showing, to a reduced scale, of a receptacle of essentially rectangular shape as may be capped in the shrink-film capping machine of the invention, FIGURES 13 and 14 being respectively side elevation and plan view showings, to the same scale, of the modified receptacle holder as would be used in connection therewith;

FIGURE 15 is a similar perspective showing of a receptacle of essentially triangular shape as may also be capped in the same machine, FIGURES 16 and 17 being respectively side elevation and plan view showings of another modified receptacle holder as would be used therewith;

FIGURES 18 and 19 are respectively side elevation and plan view showings to the same reduced scale, showing further modifications of the receptacle holder to accommodate circular receptacles, similar to that of FIGURES 9–11, but having different height proportions;

Figure 1:
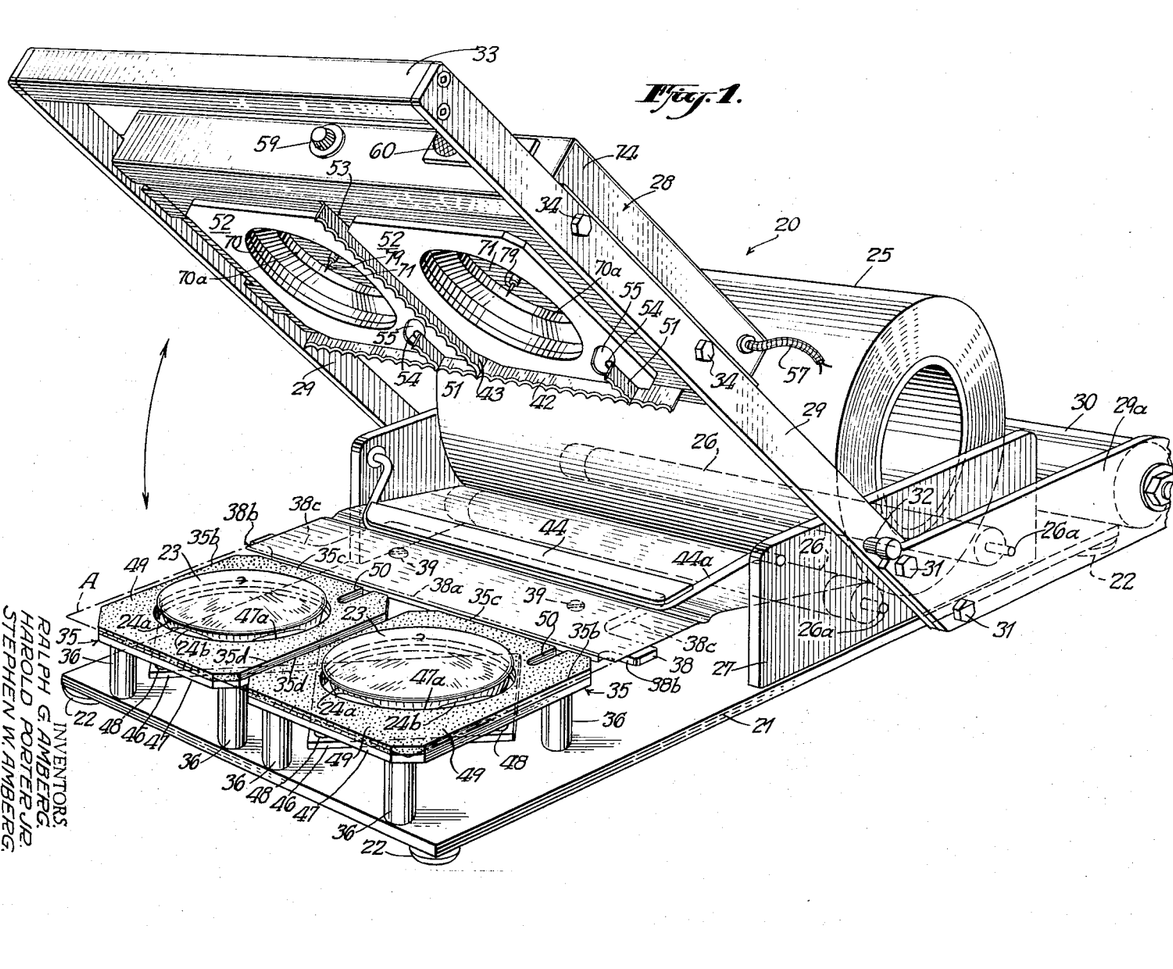
FIGURE 1 is a perspective view of a shrink-film capping machine for forming closures in accordance with the invention, the showing including two circular-shaped receptacles within the machine on each of which an individual closure has been formed.
Figure 4:
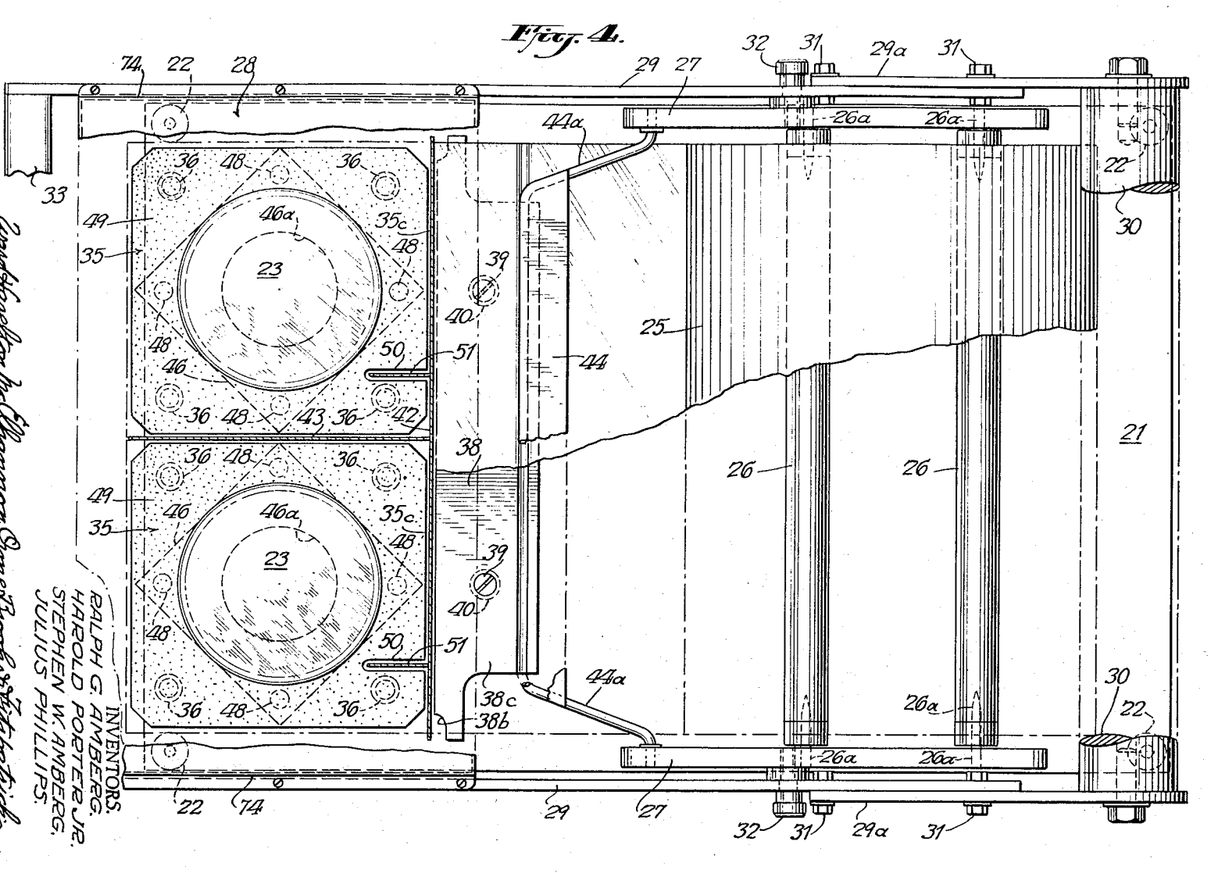
FIGURE 4 is a partially fragmented plan view of the machine to the scale of FIGURE 2 and taken as generally indicated by lines 4—4 of the latter figure.

Referring first to FIGURE 1 which shows the overall arrangement of a shrink-film capping machine 20 in accordance with the invention, the base plate 21 thereof is of metal, such as ¼″ aluminum plate, and has suitable short rubber legs 22 to facilitate placing of the machine on a table or the like in a delicatessen or other food store where it may be employed to advantage in simultaneously forming shrink-film closures, as generally indicated by numeral 23, on two tray-like receptacles 24 within which the merchant has placed a comestible item, such as potato salad, cottage cheese, cole slaw, fruit salad, etc., which he had ladled from a bulk supply. Both closures 23 are formed of shrink-film material, such as biaxially oriented polyethylene film, taken from the roll 25 thereof. The roll of shrink-film material is disposed transversely of the base plate 21 towards the rearward end of the latter as shown, the roll 25 being mounted in centerless manner on the pair of wood rollers 26. The rollers 26 have metal shafts 26a which are mounted for free rotatable movement between the pair of vertical aluminum side plates 27 which are attached to the base plate 21. During a capping operation the leading edge of the sheet material will be drawn forward from the roll to dispose a common, oversized sheet of the film across the mouth openings of both receptacles 24, as indicated by the dotted lines A in FIGURE 1 and as illustrated in FIGURE 4.

A downwardly pivotable support for a capping head unit, generally indicated by numeral 28 and as will be described, is formed by a pair of side arms 29 which are normally held in their upper, angular position as shown in FIGURE 1 by a steel counterweight 30 attached between the normally horizontal side arm extensions 29a. The side arms and side arm extensions are of ¼″ aluminum stock and are respectively attached together by bolts 31, thus forming respective side arm units which are pivotally mounted on the vertical side plates 27, as by respective bearings 32 which directly mount each side arm 29 to the latter. A wood handle 33 is attached between side arms 29 at their forward ends, the handle being in spaced relation with respect to the capping head 28 as shown. The capping head unit 28 is attached in fixed relation between the side arms 29 by bolts 34.

Figures 20, 21:
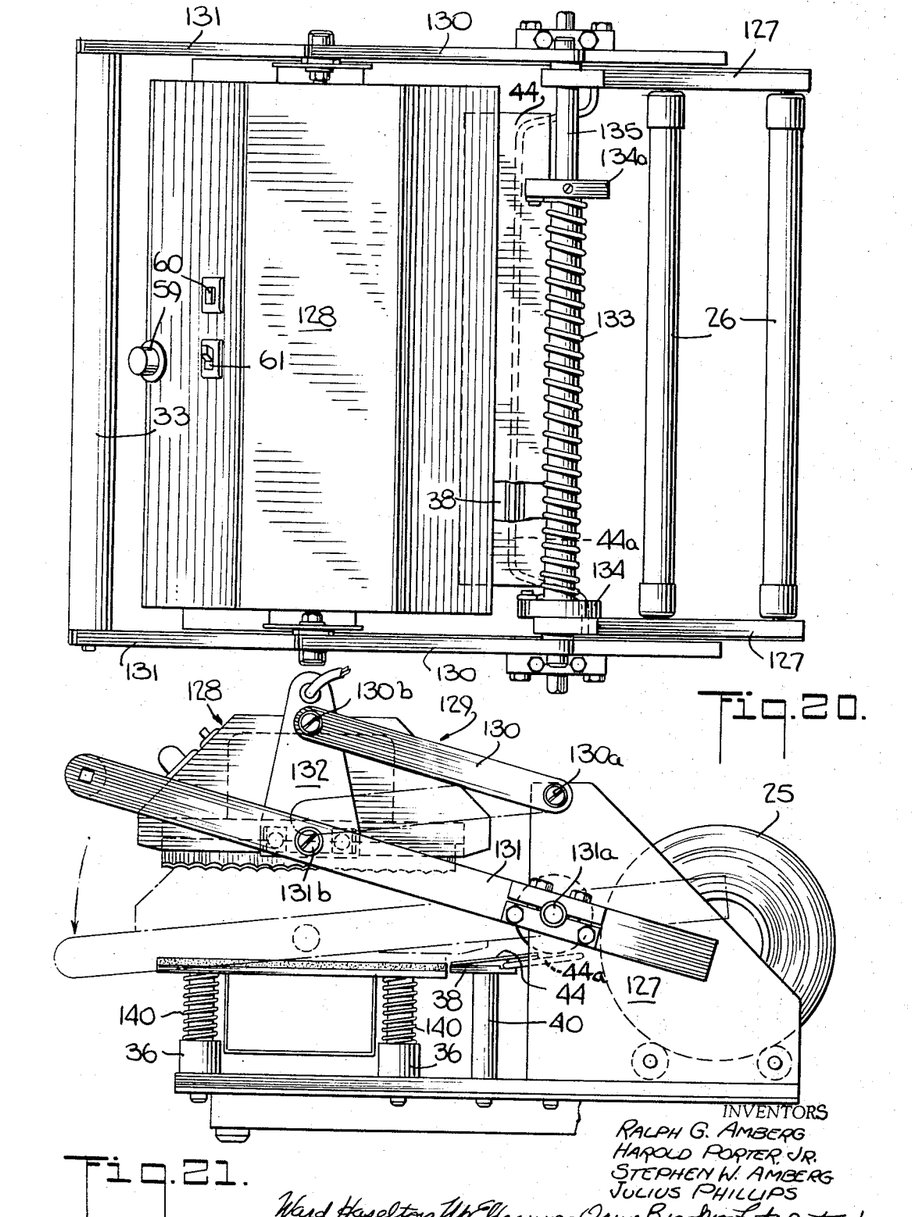
FIGURES 20 and 21 are top plan and side elevational views, respectively, of a modified form of capping machine in accordance with the invention.

A modified form of support for the capping head unit is illustrated in FIGURES 20 and 21. In this embodiment the capping head unit 128 is mounted by a pantograph arrangement, generally indicated by reference numeral 129, so that the capping head is at all times maintained in a downwardly facing position. In this embodiment, the base of the machine includes vertical side plates 127 which have greater height than the side plates 27 of the FIGURE 1 embodiment, and the mounting arrangement includes respective pairs of parallel, spaced apart pivotal arms 130, 131 at opposite sides of the machine. The pivotal attachments 130a and 131a of each arm to its associated side plate 127 are in vertical alignment, as shown, and are further held in parallel relation by additional respective pivotal attachments 130b and 131b to a vertical side plate 132 which is attached in fixed relation to the capping head unit 128. As indicated by the dotted line showing in FIGURE 21, the capping head unit 128 may be raised and lowered while maintaining the same in downwardly facing position, this being an advantage in certain applications.

In addition, FIGURES 20 and 21 illustrate a torsion spring 133 as may be used to normally retain the capping head unit 128 in its raised position, rather than the counterweight 30 of the FIGURE 1 showing. A torsion spring mounting block 134 is attached to one of the vertical side plates 127 of the base frame, and a second torsion spring mounting block 134a is attached to a transversely extending pivotable shaft 135. The shaft 135 is journaled through the side plates 127 and is attached at each of its ends to the respective of the pivotal capping head unit support arms 131. The torsion spring 133 is attached at each of its ends to the respective mounting blocks 134 and 134a, and its tension and direction of winding is such as to normally maintain the capping head unit in its raised position, and to permit lowering of the capping head unit against its spring tension, as will be understood.

Figure 2:
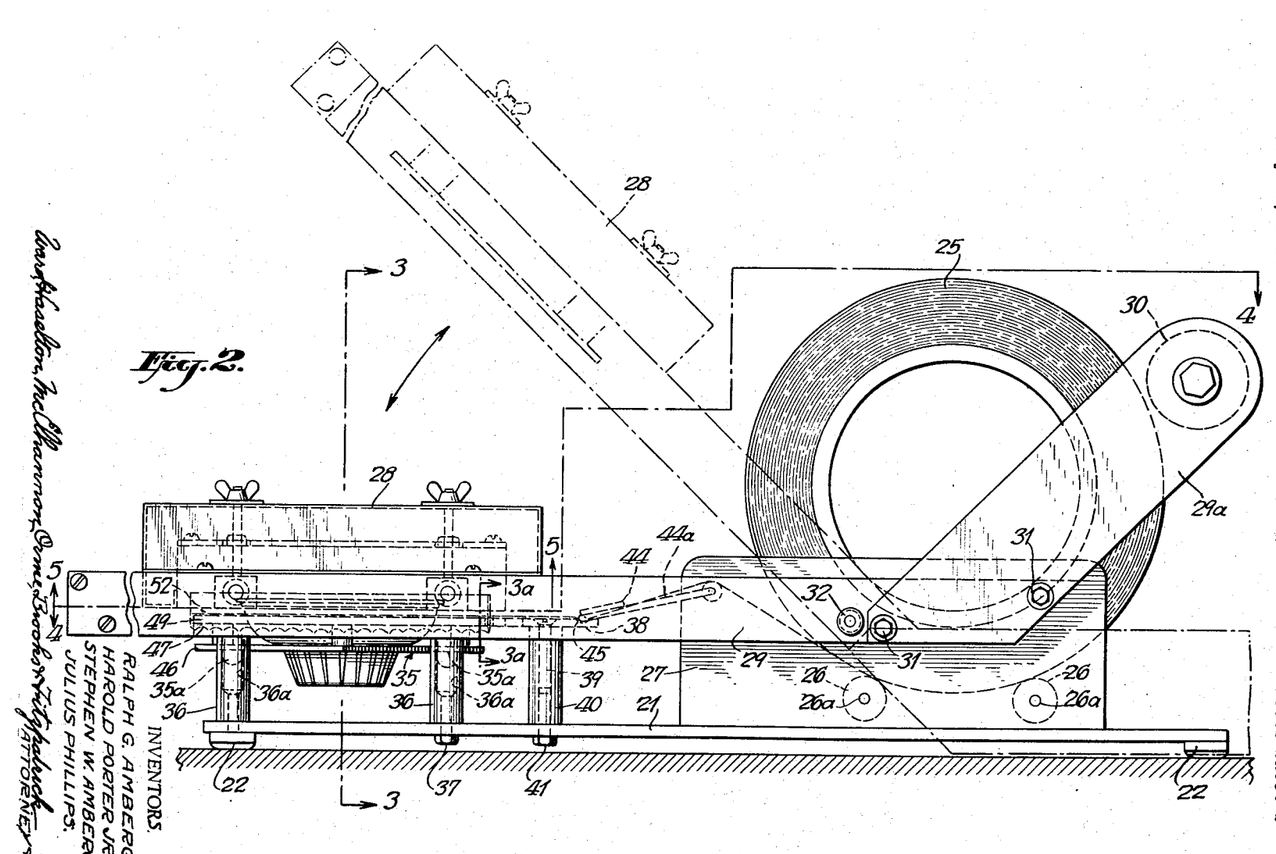
FIGURE 2 is a side elevation of the machine, and illustrating its operation.
Figure 3:
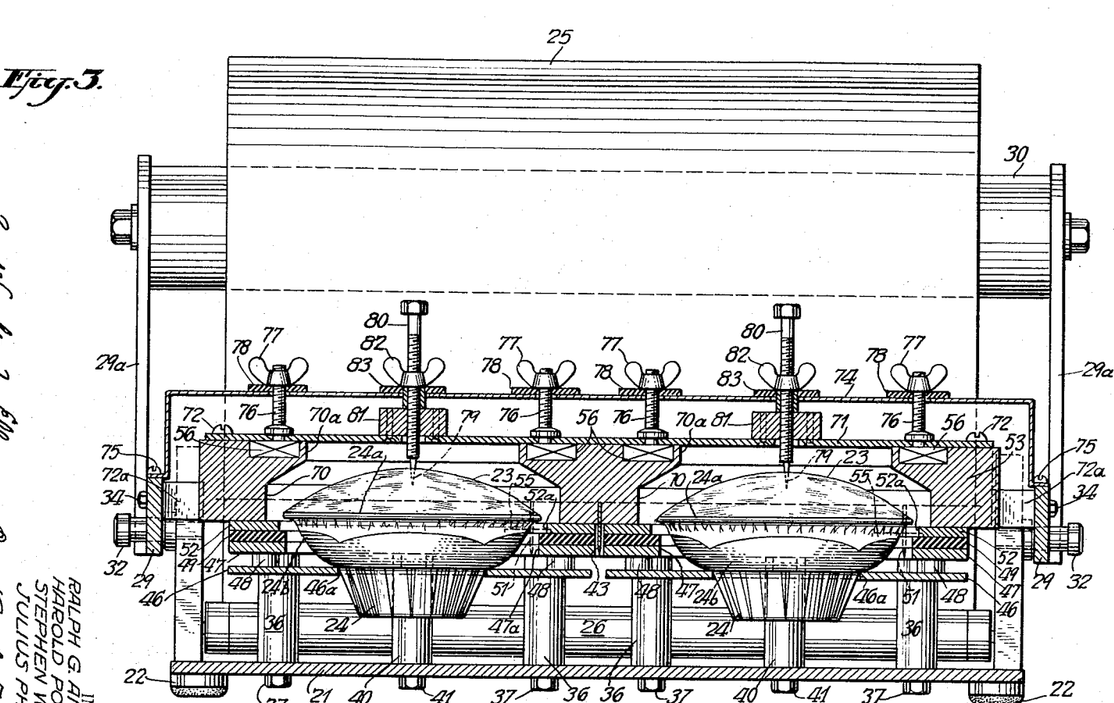
FIGURE 3 is a front sectional elevation of the machine to a slightly larger scale, the view being taken at lines 3—3 of FIGURE 2.

Referring again to FIGURE 1, the pair of removable receptacle holders, generally indicated by reference numerals 35, are located at the forward end of the base plate 21 and are supported by two groups for four vertically disposed receptacle holder spacers 36 each of which is attached to the base plate as by a bolt 37 (FIGURES 2 and 3). The spacers 36 are each hollowed from their top ends as indicated by numeral 36a in FIGURE 2 to receive one of the respective dowel-like legs 35a of that receptacle holder 35 which each group of four spacers 36 accommodates. Referring briefly to FIGURE 21, it will be understood that the receptacle holder support means may include coil springs 140 surrounding the respective spacers 36 and providing direct support for the receptacle holder 35. Considering a loose-fitting relation between the dowel-like legs 35a and the hollows 36a of the receptacle spacers 36, it will be seen that each receptacle holder 35 may thus be supported in "floating" manner to always accommodate the capping head unit in flush-fitting relation to assure even distribution of sealing heat and pressure throughout the shrink film during a capping operation, as will be later more fully understood. In any event, each of the receptacle holders 35 is removable as a unit, by simply lifting it out of engagement with its supporting receptacle holder spacers 36, so that it may be replaced by one of the modified forms thereof as will be described. However, it should be here noted that, regardless of which modified form of receptacle holder is used, its extreme upper surface will always be situated at substantially the same elevation as any other when the holder is seated on the spacers 36.

Having its upper surface at this same elevation, and disposed between the pair of receptacle holders 35 and the roll 25 of shrink-film material, is a film support table 38. The table 38 is attached, as by screws 39, to their pair of table spacers 40 (FIGURES 2 and 3) which are, in turn, respectively attached by bolts 41 to the base plate 21. As measured transversely of the machine 20 and as referenced in FIGURE 1, the continuously extending film support table 38 has length equal to the overall distance between the extreme outer edges 35b of the pair of slightly spaced apart receptacle holders 35, which distance is in turn equal to the width of the sheet of shrink-film closure material on the roll 25. The leading edge 38a of the table 38 is in fixed position such that it will be close to, but spaced from the aligned rearward edges 35c of both receptacle holders 35 a distance to permit passage therebetween of a transversely extending and vertically depending knife 42 of the capping head 28 as will be subsequently described in greater detail. A similar spacing is provided between the cofacing side edges 35d of the respective receptacle holders, this spacing being for passage of the longitudinally disposed and vertically depending knife 43 of the capping head 28 as will also be subsequently described in detail. It will be apparent, therefore, that one function of the table 38 is to cooperate with the receptacle support holders 35 in supporting the shrink-film material at the time it is severed from the roll 25 thereof by the knife 42 during the capping operation.

Another function of the table 38 is to support the leading edge of the shrink-film material in position to be grasped by the fingers at the time when a subsequent capping operation is to be initiated. For this purpose the opposite ends of the table 38 are notched at both the forward and rearward sides thereof, as respectively indicated by reference numerals 38b and 38c, the latter notches being the larger as shown. In addition, a film weight 44 holds the leading edge of the shrink-film material in position on the table 38 so that the material will not be subject to erratic movement due to breezes, electrostatic forces, etc. The film weight 44 is attached to a pivotable film weight rod 44a, the latter being pivotally connected at its ends to the respective vertical side plates 27 of the machine. The rod 44a seats in a continuously extending notch 45 of the upper surface of the table 38, as more clearly indicated in FIGURE 2.

The construction of each of the removable individual receptacle holders 35 is probably best understood by reference to FIGURES 1–3 inclusive. Each holder 35 is formed by a receptacle supporting lower plate 46, which may or may not be apertured as at 46a depending upon the height of the receptacle 24 to be capped, and an upper plate 47 which is liberally apertured as at 47a with respect to the receptacle 24 which extends therethrough as shown most clearly in FIGURES 1 and 3. Both plates 46 and 47 are generally square-shaped in plan view and are attached together in vertically spaced apart relation by four receptacle support plate spacers 48, the lower plate 46 being disposed in ninety-degree offset relation with respect to the upper plate 47 as shown in FIGURE 1. In the several modified forms of the receptacle holders 35, the height of the plate spacers 48 may be varied to accommodate receptacles of differing heights. Referring to FIGURE 2, it will be understood that the dowel-like legs 35a which support the receptacle holder on the spacers 36, are attached to the underside of the upper plate 47 in all of the modified receptacle holder forms so that the top surfaces thereof will be disposed at the elevation of the table 38 when placed in the machine, as aforementioned.

In the illustrated embodiment, a correspondingly apertured sheet of soft density neoprene sponge 49 is cemented to the top surface of the receptacle holder upper plate 47 to resist and delay actual shrinkage of the shrink-film material while heating the same during the capping opration as will be described. In such instance, the upper surface of the neoprene sheet resides at the elevation of the top surface of table 38 when the holder is in the machine. However, in an alternative embodiment (not illustrated) the top surface of the upper plate 47 is given a sand blasting treatment to impart the desired film shrinkage resistant characteristic thereto, in which case the sheet of neoprene 49 is omitted and additional depending legs are added, or the plate thickness is such that its upper surface will be disposed at the previously indicated desired elevation of the table 38. In either case, momentary resisting of film shrinkage ultimately results in better and more uniform shrinkage of the film to form a stronger tape-like grip on the receptacle side wall.

Figure 7:
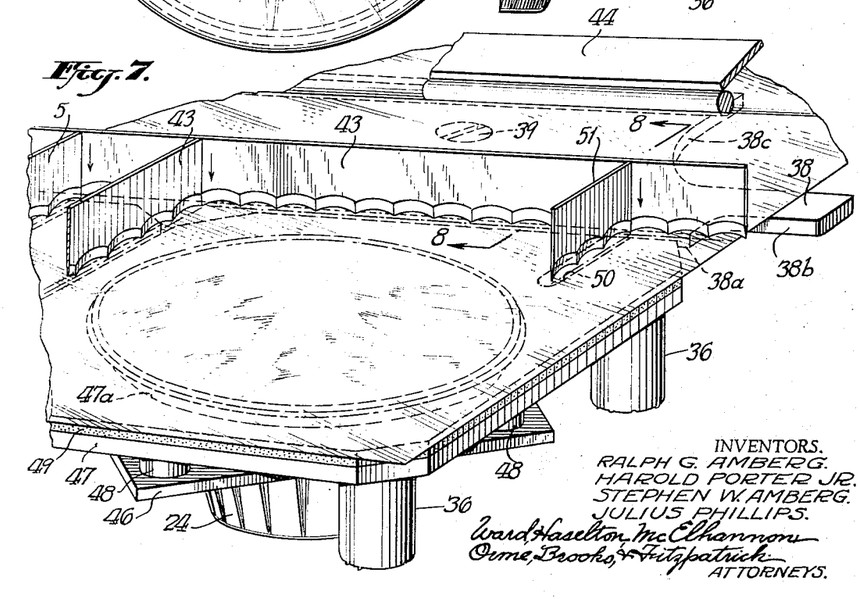
FIGURE 7 is an enlarged and fragmentary perspective showing of only the cutting knives of the capping head as they engage and cut the shrink-film material during a capping operation.

Referring to FIGURES 1 and 7, it is seen that both the neoprene sheet 49 and the underlying upper plate 47 of each receptacle holder 35 is longitudinally slotted, as at 50, for passage of a longitudinally extending and vertically depending knife segment 51 of the capping head 28 for a purpose as will be described.

During the capping operation, film shrinking heat is applied only to that area of the shrink-film material as is disposed on the neoprene surface 49. The shrinking heat is directly applied to the film by a corresponding sized and apertured film heating plate 52 which is attached to the capping head 28 as will now be described in detail.

The two stainless steel film heating plates 52, one corresponding to each of the receptacle holders 35, are heated to a temperature of from 275° F. to 320° F. by the cast aluminum heat platen 53 to the underside of which the plates are attached by screws (not shown) which pass through the platen from its top. Thus, the plates 52 are removable for replacement with plates having different sized or shaped apertures 52a to accommodate correspondingly different receptacles. Moreover, it is preferable that the underside surface of each steel plate 52 be sand blasted to assist in delaying film shrinkage when in actual contact with the film. Completing the description of the film heating plates 52, and referring especially to FIGURES 1 and 5, each plate has a longitudinal slot 54 so that the plate accommodates the depending knife segment 51 of the capping head, and a diagonally disposed, oval-shaped upward recess 55 at the location of the forward end of the knife segment 51. The recess 55 provides a non-contacting zone of the film heating plate at this location so that, during a capping operation, the underlying film remains relatively cool and does not shrink to any significant extent. Thus, the unshrunken area of the film provides an unstressed region into which the cut performed by the knife segment 51 extends, thereby providing an initial tear in the finished closure by which it may be conveniently removed from the receptacle 24 as will be more fully described.

Figure 6:
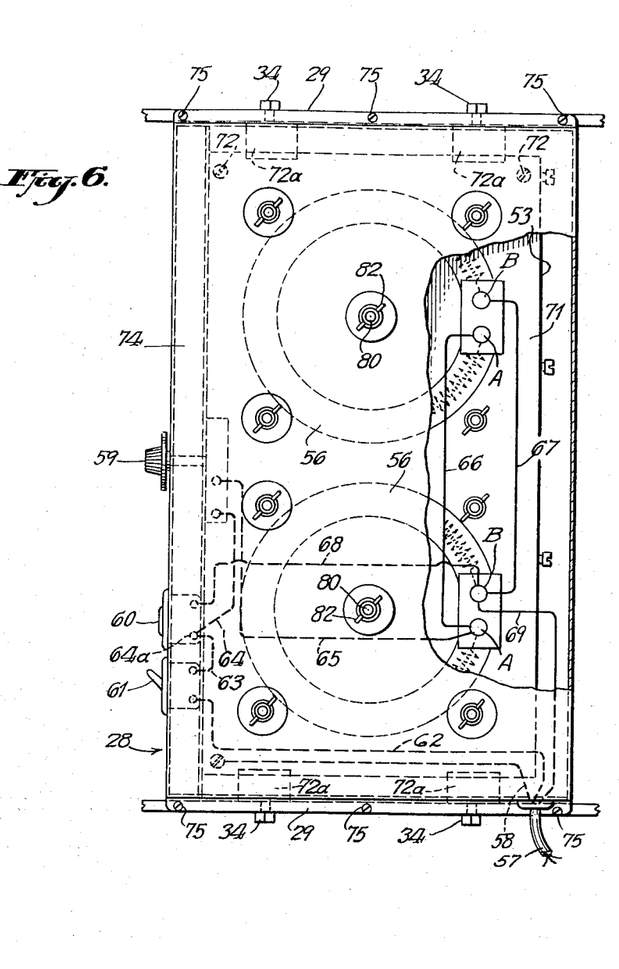
FIGURE 6 is a sectionalized plan view to the same scale from above of only the capping head of the machine to show diagrammatically the wiring of its electrical elements.

Referring to FIGURES 3 and 6 it will be understood that the heat platen 53 which transmits the film shrinking heat to the plates 52 is itself heated by a pair of electrical heating ring elements 56 which are of the Chromalox type and which are respectively disposed in recesses of the upper surface of the platen 53 above the plates 52.

A schematic wiring diagram showing how the heating ring elements 56 are heated is shown in FIGURE 6. The two-wire AC system operates on 120 volts and produces 300 watts. Referring to FIGURE 6, the power supply lead 57 includes a ground wire 58 which is connected to the heat platen 53 for usual reasons. It will be noted that the two heating ring elements 56 are wired in parallel, and that a thermostat 59 for regulating their temperature is in series with both rings 56. A pilot lamp 60, to indicate that the unit is turned on, is wired in parallel with the thermostat and heating ring circuit, and that the On-Off switch 61 of the unit is located in one of the input leads 62. Tracing the input lead 62, it first goes through the switch 61 and thence by wire connection 63 to a terminal 64a on pilot lamp 60 which terminal is also common to one side of the thermostat 59 by the wire connection 64. The other side of the thermostat 59 is connected by wire 65 to one terminal A of one of the ring elements 56, the latter being common to the terminal A of the other ring element 56 by the wire connection 66. The other respective terminals B of ring elements 56 are connected together by wire 67, completing their parallel arrangement. By the wire connection 68 from the other side of the pilot lamp 60 to the terminals B of the ring elements 56, the lamp is connected in parallel with the thermostat and ring element circuitry, but behind the switch 61, since the other input lead 69 is connected to the same B terminal.

Referring again to the construction of the heat platen 53, and as best illustrated in FIGURES 1 and 3, individual capping heads 70 for enveloping the tops of the respective receptacles 24 are formed by the respective annular hollowed areas which pass through the platen 53 from top to bottom. The capping heads 70 are narrowed at their top ends, as at 70a, so that each heating ring element 56 may be more closely associated with the immediately surrounding metal structure of its associated capping head. The top ends of the capping heads 70 are closed by a heater cover plate 71 which is directly attached, as by screws 72, across the top of the heat platen 53.

Figure 5:
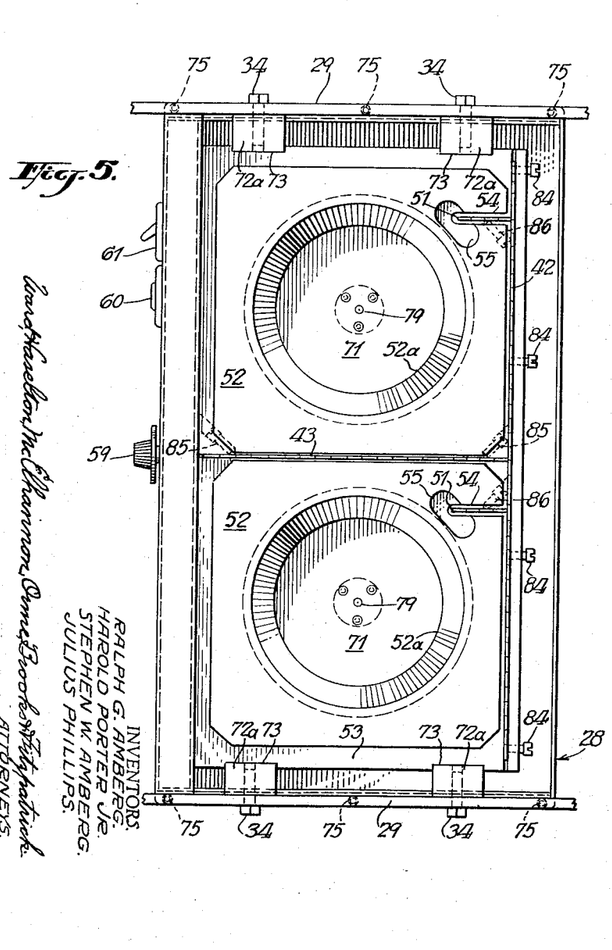
FIGURE 5 is a plan view to the same scale from the underside of only the capping head of the machine, as seen from lines 5—5 of FIGURE 2.

Referring to the attachment of the heat platen 53 between the pivotable arms 29, it will be understood from FIGURES 3, 5 and 6 that the bolts 34 actually attach respective spacer blocks 72a to the arms 29, and that the heat platen 53 is appropriately slotted, as at 73 (FIG. 5) only over the lower half of its height so that the platen 53 slidably engages and comes to rest against the blocks 72 which are essentially square shaped. A heat guard 74 is attached, as by screws 75, to the respective arms 29 and extends over the heat platen 53 in spaced relation thereto as indicated in FIGURE 3. A suitable number of pressure bolts 76 are threaded through the guard 74, the bolts 76 having wing nuts 77 and rubber heat baffles 78 at their exposed ends above the guard 74. In the mounting of the capping head unit 28 between the pivotable arms 29, the heat platen 53, with the heating rings 56 and cover plate 71 assembled thereto, is slidably mounted on the spacer blocks 72a to rest thereagainst as previously indicated. The pressure bolts 76 are mounted on the heat guard 74, whereupon the heat guard 74 is attached to the arms 29 by the screws 75. Thereafter, the wing nuts 77 are rotated to lower the bolts 76 into pressure engagement with the cover plate 71 of the platen so that the bolts 76 prevent the platen 53 from sliding out of engagement with the spacer blocks 72a.

It should be noted that the spacing between the heat guard 74 and the heat platen 53 (FIGURE 3) is insulating air space. Moreover, the guard 74 is made of material, such as stainless steel, which is a poor conductor of heat.

For puncturing the centers of each of the two closures 23 which are simultaneously formed by the machine, the capping head unit 28 includes a downwardly projecting needle 79 mounted on the cover plate 71 above the centers of the respective capping heads 70 as shown in FIGURES 1, 3, 5 and 6. The needles 79 are mounted for vertical adjustment to suit the height of the receptacle 24 and the anticipated height of the "mounded" closure 23. Such vertical adjustment is made by the bolts 80 to which the respective needles 79 are attached, the bolts threadedly engaging the respective spacer blocks 81 which are attached to the heat platen cover plate 71. The bolts 80 pass upwardly through the guard 74 for convenience in operation from the exterior of the capping head unit 28. Wing nuts 82 serve as lock nuts to lock the bolts 80 in any selected extended position, and a rubber heat baffle 83 is situated below each of the wing nuts 82.

Figure 3A:
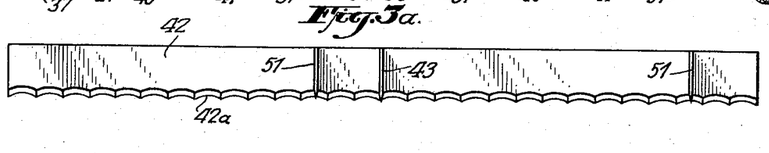
FIGURE 3a is a front elevational view, to the scale of FIGURE 3, showing the details of the knife arrangement which is included in the capping head of the machine, the view being generally as indicated by lines 3a—3a of FIGURE 2.

Referring now to the attachment of the film cutting knives 42, 43 and knife segments 51 to the underside of the capping head unit 28, reference is first made to FIGURE 3a which shows the general configuration of the knives, all of which are similarly shaped. In that figure the knife 42 is clearly shown as having a scalloped cutting edge 42a which edge is beveled on both sides. The blades of the other knives have identical scalloped cutting edges, as seen from FIGURE 1. Referring to FIGURE 5, it will be understood that each of the knives 42 and 43 and knife segments 51 reside in suitable slots formed in the underside of the heat platen 53, about half of the height of the knife projecting below the bottom surface of the platen as will be understood from FIGURE 8. The transversely extending knife 42 is secured in place by four set screws 84 which are threaded into the platen 53 from its rearward end and which press the knife 42 against the forward end of the slot (not numbered) in which it resides. Similarly, longitudinally extending knife 43 is secured in place by two set screws 85 which are threaded diagonally through the platen 53 to press the knife 43 against the opposite side of the slot (not numbered) wherein it resides. In similar manner, each of the knife segments 51 are secured in place by a diagonally extending set screw 86.

Figures 12, 13, 14:
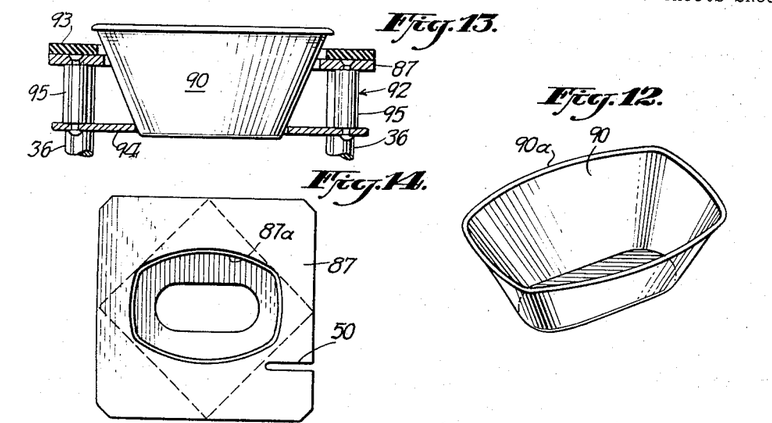
Figures 15, 16, 17, 18:
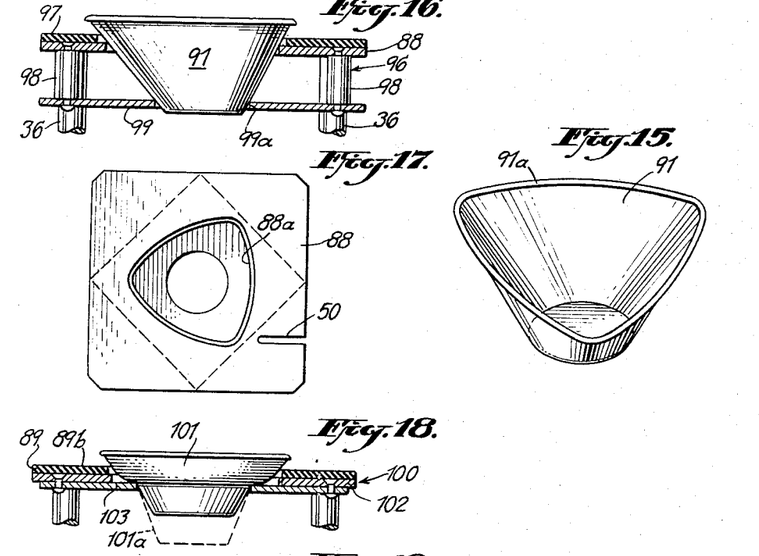
Figure 19:
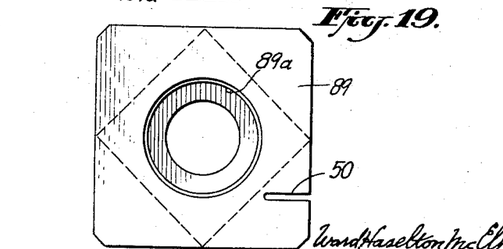

Referring now to FIGURE 4 which shows the manner in which the knives 42 and 43 and knife segments 51 meet and cut the shrink-film material which has been drawn from the roll 25 and disposed across the top of both receptacle holders 35, it is seen that the transversely extending knife 42 will sever the film web within the space provided between the rearward edges 35c of the receptacle holders and the forward edge 38a of the film supporting table 38. Moreover, the T-shaped arrangement between knives 42 and 43 provides a longitudinal severing of the film to form the individual closures on the receptacles within each of the receptacle holders 35. The knife 43 cuts the film web within the spacing provided between the two receptacle holders 35. As is apparent from the drawings, each of the knife segments 51 extends longitudinally from the transverse knife 42, but the location of each knife segment 51 with respect to the central apertures 47a of the receptacle holder upper plates 47 is such that the knife segment 51 slits the excess closure-forming material surrounding the aperture 47a from its rearward edge and in direction which, were the line of cut extended, would be tangent to the mouth rim of the receptacle being capped. Referring briefly to FIGURES 14, 17 and 19, wherein respective upper plates 87, 88 and 89 of modified forms of receptacle holders are shown in plan view, it will be understood that the respective apertures therein which receive receptacles of varying shapes are located and arranged with respect to the respective knife segment slots 50 of the plates such that the knife segments 51 (not shown in FIGURES 14, 17 and 19) will form a slit in the shrink-film excess material which is directed tangentially with respect to the mouth rims of the respective receptacles.

It will also be understood from FIGURES 12 and 15 that basically rectangular shaped receptacles 90, and basically triangularly shaped receptacle 91, also of stiff paper or plastic or the like, may be received in the machine 20, for the purpose of providing a shrink-film closure thereon. Where such substitution of receptacles is to be made, the respective modified forms of receptacle holders as shown in FIGURES 13, 16 and 18 are used. To receive the rectangularly shaped and rather deep receptacle 90, the receptacle holder 92 as shown in FIGURE 13 is used. Its upper plate 87 has an aperture 87a therein (FIGURE 14) which generally conforms to the shape of the mouth rim 90a of the receptacle, and has neoprene sheet material 93 adhesively secured to its top surface for previously described purposes. The receptacle supporting lower plate 94 of the holder is spaced considerably below the upper plate 87 by the elongated spacers 95, and is similarly apertured to support the receptacle 90. The receptacle holder 92 thus formed seats on the receptacle spacers 36 of the machine, as previously explained. A somewhat similar, but shallower depth receptacle holder 96 is shown in FIGURES 16 and 17, the same being adapted to receive the triangular shaped receptacle 91. Referring to FIGURE 17, its upper plate 88 has a generally triangular shaped opening 88a conforming in shape to that of the mouth rim 91a of the receptacle. As seen in FIGURE 16, the upper plate 88 has neoprene sheet material 97 adhesively secured thereto, and shallower depth spacers 98 attached to its underside to support the lower plate 99 of the holder. The lower plate 99 has a generally circular aperture 99a formed therein to receive and support the lower end of the receptacle 91. In FIGURES 18 and 19 a further modified form of receptacle holder 100 is shown for receiving shallow depth circular receptacles 101 or, as indicated by dotted lines 101a, circular receptacles having a widened upper portion and a narrower but deeper lower portion. The upper plate 89 has a circular aperture 89a to accommodate the receptacle 101. Referring to FIGURE 18, it will be understood that the upper plate 89 has a sand blasted upper surface 89b, rather than neoprene disposed thereon as in the other embodiments. A shallow, plate-like spacer 102 supports the lower plate 103 of the receptacle holder 100, the latter being suitably apertured to support the lower end of the receptacle 101.

The operation of the shrink film capping machine 20 is as follows:

Assuming that circular receptacles 24 are to be filled and capped, the appropriate receptacle holder unit 35 is placed in the machine 20, the same being seated on the receptacle holder spacers 36 as previously described. Similarly, the appropriately apertured film heating plate 52 is attached to the capping head unit 28 at the underside of the heat platen 53 of the latter.

The machine is connected to an electrical source and turned on for warm-up, using the On-Off switch 61. The pilot lamp 60 will, of course, light to indicate that the machine is operating. The thermostat 59 is adjusted to determine the proper shrink-film capping temperature of the film heating plates 52, this temperature being from 275° F. to 320° F., as aforesaid.

A roll 25 of shrink-film material is placed on the transversely extending rollers 26 so that its leading edge feeds from its underside, as shown in FIGURE 1. The edge of the film is drawn forward to the location of the leading edge 38a of the film supporting table 38, the film being passed under the film weight 44.

The height of extension of the closure puncturing needles 79 is adjusted by appropriately rotating the bolts 80 (FIGURE 3) and locking the same in place using wing nuts 82 as previously described.

When the machine is at operating temperature, two comestible filled receptacles 24 are placed respectively within the receptacle holders 35, and it will be noted, from FIGURE 3 for example, that the mouth rim 24a of each receptacle 24 projects considerably above the upper surface of the receptacle holder neoprene sheet 49. Such exposure of the receptacle side wall 24b at the upper end of the receptacle 24 will cause the shrink-film closure to "tape" nicely about the receptacle side wall within this exposed region as the closure is formed.

The leading edge of the shrink-film material is then drawn forward manually by the machine operator until it coincides with the aligned forward edges (not numbered) of the receptacle holders 35, as indicated by dotted lines A in FIGURE 1. It will be noted that the areas of the film which are disposed on the receptacle holder neoprene surfaces 49 are considered "excess" film areas which will be heated and shrunken to form and apply each individual closure to the respective receptacles 24.

The operator then grasps the wood handle 33 of the machine and lowers the capping head unit 28 to cover the receptacles, the capping head unit heating plates 52 being then in direct contact with only the excess shrink-film material which is disposed on the respective neoprene surfaces 49 of the receptacle holders 35, as seen in FIGURES 2 and 3. The capping head is lowered, of course, by the pivoting of the arms 29 about their pivot points 32.

The capping head unit 28 is held in this position for only a few seconds of time. In fact, assuming the proper temperature of the plates 52, as little as one-half second in time has been found adequate to satisfactorily form the closures, although a few seconds is preferable. Moreover, it has been found that the head may be kept in its lowered position for a considerable period of time (i.e., even several minutes) without destroying the shrink-film material or affecting the quality of the closures 23 as ultimately formed.

When the capping head unit 28 comes into contact with the shrink-film material, its knives 42 and 43 will sever the material to form the individual closure sheets which are then being heated only over their peripheral excess areas, as previously mentioned. In addition, it will be noted that the knife segments 51 will simultaneously form the respective tear slits 105 (FIGURES 10 and 11) within this excess material, as previously mentioned, but that the recessed zones 55 in the respective film-heating plates 52 will prevent heating of the shrink-film in the underlying correspondingly shaped zones of the film into which the ends of the respective tear slits 105 extend.

After a few seconds of film heating time has elapsed, the operator simply releases his grasp on the handle 33, whereupon the counterweight 30 will pivot the arms 29, and the attached capping head unit 28, to their upper positions as shown in FIGURE 1. Immediately upon release of the shrink-film from its "sandwiched" relation between the film heating plates 52 and the upper plates of the receptacle holders 35, the heated excess peripheral areas of the film surrounding each receptacle will shrink rapidly. The shrinking action is almost instantaneous so that each closure 23 has "snapped" in place about the side wall 24b of its associated receptacle before the capping head unit 28 has reached its upper position. The shrunken film material forms tightly about the sidewall 24b of the receptacle, below the receptacle mouth rim 24a, but the central area of the film which overlies the contained comestibles remains virtually unshrunken. However, as will be apparent from the disposition of the heating ring elements 56 within the heat platen 53 at the respective top ends 70a of each capping head 70, radiantly heated air which is retained within the confines of the covered capping head will tend to shrink and thereby tighten such central area of the film so as to generally eliminate wrinkles and produce a very neat appearing closure, regardless of the peripheral shape of the receptacle mouth rim.

Figure 22:
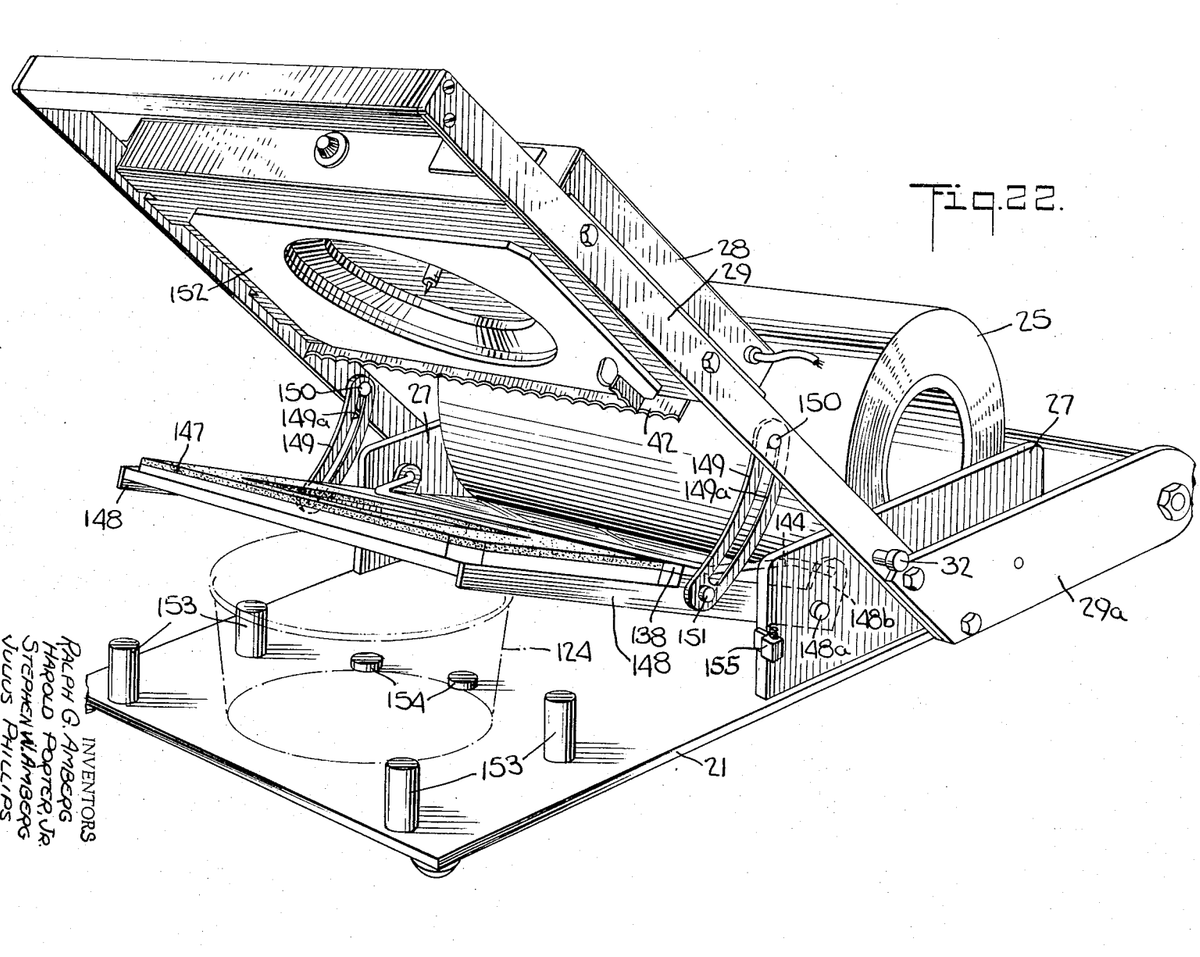
FIGURE 22 is a perspective showing of still a further modified form of capping machine in accordance with the invention.

In a further modification of the capping machine as illustrated by FIGURE 22, and as will be found especially useful when capping large receptacles such as gallon capacity "tubs" 124 which when filled may weigh about ten pounds, the receptacle holder upper plate 147 is supported at each side by a pivotal arm 148, the arms 148 being pivotably attached at pivot points 148a to the inwardly facing surfaces of the respective vertical side plates 27 of the base frame. The respective capping head unit mounting arms 29 are located outwardly of the side plates 27 and therefore are clear of the arms 148 during their downward pivotal movement of both. In addition, a pair of vertically disposed links 149, each having an arcuately shaped slot 149a and respectively connecting the arms 29 and 148 at each side of the machine, suspends the plate supporting arms 148 from the arms 29 when the latter are in raised position. A roller or pin 150 is attached to each of the capping head unit mounting arms 29 to slidably engage the respective link slots 149a, and the lower ends of the links 149 are pivotally connected to the respective arms 148 at pivot points 151, as shown. Thus, when the arms 29 are in their raised position, the receptacle holder upper plate 147 is suspended by its weight therebelow but is also in a raised position, the liberal spacing between the plate 147 and the film heating plate 152 of the capping head unit being determined by the length of the links 149 since the upper ends of their slots 149a are against the upper arm pins 150. When the arms 29 are lowered, the centrally apertured receptacle holder upper plate 147 is lowered to a horizontal position against the base plate vertical stops 153 to surround the open top end of the receptacle 124 at an elevation below the mouth rim thereof whereupon, by reason of the arcuate slots 149a, the arms 29 are free to continue their downward movement so as to bring the capping head heating plate 152 into cofacing contact relation therewith.

The FIGURE 22 modification permits relatively heavy, filled tubs to be slid into capping position against a pair of lateral positioning stops 154, and thereby eliminates the need for lifting the filled receptacle and placing the same within the aperture of a receptacle holder of the type shown in FIGURE 1.

It will be noted that the shrink-film support table 138 and film weight 144 are mounted on and carried by the arms 148, the film weight 144 being pivotably connected to upward extensions 148b of the latter. After the tub-like receptacle has been positioned against stops 154 and before lowering the capping head unit 28, the operator draws the shrink-film sheet material, from the roll 25 thereof, first between the support table 138 and the film weight 144 and then across the upwardly facing surface of the plate 147. Thus, the shrink-film is disposed between the capping head unit and the plate 147, the film resting against the latter. The head is then lowered, whereupon the shrink-film is also disposed across the open top end of the receptacle. Further lowering of the capping head unit sandwiches the film between the plates 147 and 152 to heat and shrink the same on to the receptacle as previously described, the transversely extending knife edge 42 of the capping head severing the film along the forward edge of the support table 144 to leave the leading edge of the film at this position for a subsequent capping operation.

It should further be noted that the arms 148 will be in substantially horizontal position when lowered, as will the arms 29, and that the latter are cushioned in their lowered position by springs 155 which are attached to the respective side plates 27.

Figures 8, 9, 10, 11:
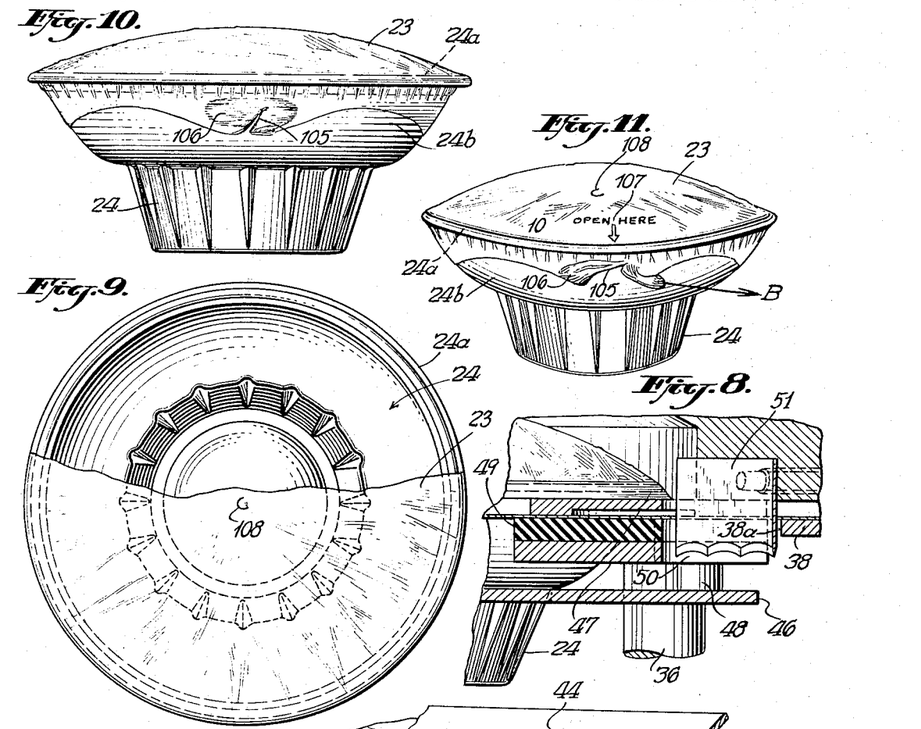
FIGURE 8 is a similarly enlarged side sectional elevation of the machine to show further of the cutting operation details as seen from lines 8—8 of FIGURE 7.
FIGURE 9 is a fragmentary plan view of a sealed container having a shrink-film closure as made in accordance with the present invention.
FIGURE 10 is a side elevation of the sealed container of FIGURE 9.
FIGURE 11 is a perspective showing of the sealed container of FIGURES 9 and 10 to illustrate how its closure is manually removed.

The resulting sealed container is illustrated in FIGURES 9–11, and it will be noted that the tear slit 105 of the closure 23 thereof extends into an unshrunken area 106 of the closure which corresponds to the shape of the film heating plate recessed area 55. Referring to FIGURE 11, arrow B indicates that the closure 23 may be torn open by simply pulling on one of the ends of the tear slit 105, preferably in the direction of its tangential dispositon as aforesaid. The ends of the tear slit 105 may be colored (not illustrated), or printed indicia 107 may be provided on the film material to draw attention to the location of tear slit 105. Moreover, the closure 23 has a puncture 108 to permit escape of gases therefrom.

Thus the invention has been described in several of its embodiments as will achieve all of the objects thereof.

What is claimed is:

1. Apparatus for applying a shrink-film type closure to the mouth rim of an open-ended receptacle or the like, said apparatus comprising a pair of centrally apertured plates in initially spaced apart relation, the central apertures of said plates each being of size and configuration for accommodating said receptacle, means for moving at least one of said plates into and out of aperture-aligned cofacing contact relationship with the other, means for heating at least one of said plates, means for supporting said receptacle whereby when said plates are in their said cofacing contact relationship said receptacle is positioned within said central apertures of both said plates and the plane of the interface between said contact plates is disposed substantially parallel to, and spaced in normal direction a distance from, said receptacle mouth rim, and a knife edge attached to one of said plates, said knife edge projecting through the interface between said plates when in their said contacting relation and extending inwardly from the peripheral edge of one of said plates a distance towards, and having an inward end terminus spaced a distance from, the central aperture of the latter.

2. Apparatus according to claim 1 wherein said knife edge extends in direction along an imaginary line which is substantially tangent to the central aperture of said one plate.

3. Apparatus according to claim 1 wherein only one of said plates is heated by said heating means, the surface of said heated plate which cofaces the other of said plates when in their said cofacing contact relationship being recessed to provide a non-contacting portion in immediate surrounding relation with at least said inward end terminus of said knife edge.

4. Apparatus for applying a shrink-film type closure to the mouth rim of an open-ended receptacle or the like, said apparatus comprising frame means, a receptacle holder mounted on said frame means, said receptacle holder comprising means for supporting said receptacle with its open end facing upwardly and means providing a plate-like surface in peripheral surrounding relation with respect to said receptacle and spaced from said receptacle supporting means whereby, when the latter is supporting said receptacle, said receptacle mouth rim is disposed substantially parallel to and spaced upwardly a distance from said plate-like surface, a heat retaining capping head unit having configuration for enveloping the top of said receptacle in out-of-contact relation during a capping operation, and means mounting said capping head unit on said frame means for movement into and out of engagement with said receptacle holder, said capping head unit comprising means providing a downwardly facing plate-like surface in peripheral surrounding relation with respect to said receptacle mouth rim and in cofacing contact relation with said plate-like surface of the receptacle holder when said capping head unit is in engagement with said receptacle holder and means for heating said capping head unit including its said plate-like surface.

5. Apparatus for applying a shring-film type closure to the mouth rim of an open-ended receptacle or the like, said apparatus comprising frame means, a receptacle holder mounted on said frame means, said receptacle holder comprising a centrally apertured plate, said plate including a top surface, and means for positioning said receptacle within the central aperture of said plate whereby said receptacle mouth rim is disposed substantially parallel to, and spaced in normal direction a distance from the plane of said top surface of the plate, the central aperture of said plate having size and configuration for accommodating said receptacle, a capping heat unit comprising a platen including a centrally apertured heat plate surface, the central aperture of said heat plate surface of the platen having configuration and size for accommodating said open end of the receptacle, said platen being recessed to provide a hollow of substantial dept extending into the platen from its said heat plate surface throughout the centrally apertured zone of the latter, means of said platen for heating the same including its said heat plate surface, and means mounting said capping head unit on said frame means for movement into and out of engagement with said receptacle holder, said platen heat plate surface being in aperture-aligned cofacing contact relationship with said top surface of the receptacle holder plate when said capping head unit engages said receptacle holder.

6. Apparatus according to claim 5 wherein said heat plate surface of said platen comprises a heat plate removably attached to said platen, and said receptacle holder is removably mounted on said frame means.

7. Apparatus according to claim 5 wherein said capping head unit further comprises a needle element projecting from said platen within said hollow and towards said heat plate surface thereof for piercing said shrink-film type closure.

8. Apparatus according to claim 7 wherein the projecting length of said needle element is adjustable and positionable at any location substantially throughout the depth of said hollow of the platen.

9. Apparatus for simultaneously applying individual shrink-film closures to the respective mouth rims of a plurality of open-top receptacles or the like, said apparatus comprising a base frame, a plurality of receptacle holders mounted on said base frame, each said receptacle holder comprising a centrally apertured plate for accommodating and positioning one of said receptacles in upright position to receive its said closure, said plates being disposed horizontally in spaced apart adjacent relationship to form a grid-like pattern thereof, means for supporting each of said receptacles within the respective central apertures of said plates whereby the respective of said receptacle mouth rims are disposed a distance above the plane of the top surface of its associated plate, a heat-retaining capping head unit carrying a corresponding plurality of horizontally disposed and similarly spaced apart heat plates each having centrally apertured configuration and size for accommodating said mouth rim of one of said receptacles, said capping head unit having configuration providing a hollow of substantial depth extending upwardly from the respective of its said heat plates for out-of-contact envelopement of the top of the receptacle associated therewith during a capping operation, and means for heating said capping head unit including its said heat plates, a knife edge attached to said capping head unit projecting below, and extending along the length of each said spacing between the respective of said heat plates, and means mounting said capping head unit on said base frame for movement into and out of engagement with all of said receptacle holders, said heat plates being in aperture-aligned cofacing contact relationship with the respective top surfaces of said receptacle holder plates when said capping head unit engages said receptacle holders.

10. Apparatus for applying a shrink-film type closure to the mouth rim of an open-ended receptacle or the like, said apparatus comprising frame means, means for positioning said receptacle with its said open end facing upwardly, a first centrally apertured plate and a second centrally apertured plate in initially spaced apart relation, the central apertures of said plates each being of size and configuration for accommodating said open end of the receptacle, means for moving and positioning said first plate in peripheral surrounding relation with respect to said open end of the receptacle and in spaced parallel relation with respect to, and at an elevation below said receptacle mouth rim when said receptacle is so positioned, means on said frame means for moving said second plate into and out of aperture-aligned cofacing contact relationship with said first plate when so positioned, and means for heating said second plate.

11. Apparatus according to claim 10 wherein said means for moving said second plate comprises an arm mounted on said frame means for substantially vertical movement toward and away from said receptacle positioning means and means normally retaining said arm in a raised position, said arm carrying said second plate, and said means for so moving and positioning said first plate comprises plate spacer means for supporting said first plate in its said position and gravity suspension means normally suspending said first plate from said arm and in its said initially spaced relation with respect to said second plate when said arm is in its said raised position, said gravity suspension means being located on said arm to permit said first plate to contact and rest upon said plate spacer means when said arm is moved a distance towards said receptacle positioning means, and said gravity suspension means further being substantially collapsible to permit said second plate to move into its said cofacing contact relationship with said so positioned first plate upon further movement of said arm towards said receptacle positioning means.

12. Apparatus according to claim 11 wherein said arm is pivotally connected to said frame means, and said means for so moving and positioning said first plate further comprises a second arm mounted on said frame means for vertical pivotal movement, said second arm carrying said first plate and being disposed between the first said arm and said receptacle positioning means, said gravity suspension means comprising a substantially vertical link connecting said first and second arms, said link being slidably connected to one of said arms.

13. Apparatus according to claim 12 wherein said link is pivotally connected to said second arm, said link being slotted in the direction of its length, and the first said arm has pin means engaging said link slot.

14. Apparatus according to claim 13 wherein said link slot is arcuately shaped.

15. Apparatus according to claim 14 wherein said link slot is arcuately shaped in direction which is opposite to that of the arcuate path of movement of said pin means on said first arm.

16. The method of forming a shrink-film type closure on the mouth rim of an open-top receptacle or the like comprising the steps of positioning said receptacle whereby its said mouth rim is in parallel spaced relationship with respect to a receptacle-surrounding surface, disposing an oversized sheet of shrink-film material across said receptacle mouth rim whereby the oversized portion of said sheet extends peripherally about said receptacle and includes a peripheral portion of substantial area in cofacing surface contact relationship with said receptacle-surrounding surface, thereafter heating to shrink temperature substantially all of said surface-contacting peripheral portion of said shrink-film material while holding the same against said receptacle-surrounding surface to resist the tendency of said peripheral portion to shrink, forming a slit in said surface-contacting peripheral portion of said shrink-film material simultaneously with said heating thereof, said slit extending from a peripheral edge of said sheet of shrink-film material to an inner end terminus within said surface-contacting peripheral portion thereof, and then releasing said heated peripheral portion of said shrink-film material whereby said peripheral portion is permitted to substantially instantaneously shrink into tight-fitting surrounding relationship with respect to the body of said receptacle at a location below said mouth rim thereof.

17. The method according to claim 16 wherein said slit is formed while maintaining in unheated condition a local area of said surface-contacting peripheral portion of said shrink film material immediately adjacent at least said inner end terminus of the slit.

18. The method of forming a shrink-film type closure on the mouth rim of an open-top receptacle or the like comprising the steps of positioning said receptacle whereby its said mouth rim is in parallel spaced relationship with respect to a receptacle-surrounding surface, disposing an oversized sheet of shrink-film material across said receptacle mouth rim whereby the oversized portion of said sheet extends peripherally about said receptacle and includes a peripheral portion of substantial area in cofacing surface contact relationship with said receptacle-surrounding surface, thereafter heating to shrink temperature substantially all of said surface-contacting peripheral portion of said shrink-film material while holding the same against said receptacle-surrounding surface to initially resist the tendency of said peripheral portion to shrink and while covering the remainder of said sheet of shrink-film material with a hollowed, heated capping head in out-of-contact relation with respect thereto to thereby expose the same to heated air, and then releasing said heated peripheral portion of said shrink-film material and removing said capping head whereby said peripheral portion is permitted to substantially instantaneously shrink into tight-fitting surrounding relationship with respect to the body of said receptacle at a location below said mouth rim thereof.

19. The method according to claim 18 and which further comprises the step of puncturing said sheet of shrink-film material, at a location within the area thereof which is disposed across said receptacle mouth rim, simultaneously with said heating of said peripheral portion of the shrink-film material.

References Cited

UNITED STATES PATENTS

| | | | |
|---|---|---|---|
| 2,898,714 | 8/1959 | Keith | 53—30 |
| 2,934,867 | 5/1960 | Vogt | 53—30 |
| 2,734,650 | 2/1956 | Meyer | 215—38 |
| 2,954,139 | 9/1960 | Owens | 215—38 |
| 2,690,593 | 10/1954 | Abercrombie | 53—112 |
| 3,014,320 | 12/1961 | Harrison | 53—41 X |
| 3,026,656 | 3/1962 | Rumsey | 53—22 |
| 3,047,991 | 8/1962 | Siegel et al. | 53—373 X |
| 3,071,906 | 1/1963 | Zebarth et al. | 53—30 |
| 3,112,587 | 12/1963 | Anderson et al. | 53—373 X |
| 3,115,735 | 12/1963 | Harrison | 53—184 |
| 3,118,262 | 1/1964 | Messick | 53—184 |
| 3,196,067 | 7/1965 | Techtmann | 53—133 X |
| 3,206,909 | 9/1965 | Hanes | 53—373 X |
| 3,262,245 | 7/1966 | Snow | 53—184 |

TRAVIS S. McGEHEE, *Primary Examiner.*

THERON E. CONDON, *Examiner.*

J. M. CASKIE, N. ABRAMS, *Assistant Examiners.*